US010972900B2

(12) United States Patent
Beaurepaire et al.

(10) Patent No.: US 10,972,900 B2
(45) Date of Patent: Apr. 6, 2021

(54) METHOD AND APPARATUS FOR PROVIDING SELECTED ACCESS TO USER MOBILITY DATA BASED ON A QUALITY OF SERVICE

(71) Applicant: HERE GLOBAL B.V., Eindhoven (NL)

(72) Inventors: Jerome Beaurepaire, Berlin (DE); Jens Von Lindequist, Birkenderder (DE); Olivier Dousse, Berlin (DE)

(73) Assignee: HERE Global B.V., Eindhoven (NL)

( * ) Notice: Subject to any disclaimer, the term of this patent is extended or adjusted under 35 U.S.C. 154(b) by 51 days.

(21) Appl. No.: 16/537,180

(22) Filed: Aug. 9, 2019

(65) Prior Publication Data

US 2021/0044959 A1    Feb. 11, 2021

(51) Int. Cl.
*H04W 12/02* (2009.01)
*H04W 8/16* (2009.01)

(52) U.S. Cl.
CPC ............ *H04W 8/16* (2013.01); *H04W 12/02* (2013.01)

(58) Field of Classification Search
CPC ................................ H04W 8/16; H04W 12/02
See application file for complete search history.

(56) References Cited

U.S. PATENT DOCUMENTS

| 9,674,701 | B2 | 6/2017 | Kim et al. | |
| 2014/0059695 | A1* | 2/2014 | Parecki | H04L 63/102 726/26 |
| 2014/0099978 | A1* | 4/2014 | Egner | H04W 4/029 455/456.6 |
| 2017/0180928 | A1* | 6/2017 | Sharma | H04W 4/02 |
| 2017/0352004 | A1 | 12/2017 | McHale et al. | |
| 2018/0367988 | A1 | 12/2018 | Kumar et al. | |
| 2019/0104409 | A1 | 4/2019 | Wu | |
| 2019/0245789 | A1* | 8/2019 | Sabella | H04L 12/1407 |

OTHER PUBLICATIONS

Damiani, "Privacy Enhancing Techniques for the Protection of Mobility Patterns in Lbs: Research Issues and Trends", Mar. 31, 2012, retrieved from https://air.unimi.it/retrieve/handle/2434/207836/242074/damiani-cpdp-revision.pdf, 12 pages.
Dubey et al., "Data-driven Mobility", Move Global Mobility Summit, Sep. 7 & 8, 2018, retrieved from http://movesummit.in/files/Mobility-data.pdf, 36 pages.

* cited by examiner

*Primary Examiner* — Chuong A Ngo
(74) *Attorney, Agent, or Firm* — Ditthavong, Steiner & Mlotkowski

(57) ABSTRACT

An approach is provided for providing user control of historical mobility data accessed by a service related to a quality of the service to be delivered to the user. The approach involves receiving a request from the user to receive the service from a service provider. The quality of service is dependent on historical mobility data associated with the user. The approach also involves determining a first part of the historical mobility data that is to be provided to the service provider to receive the service. The approach further involves determining a second part of the historical mobility data that is predicted to increase the quality of service of the service. The approach further involves providing a user interface for the user to select between the first part, the second part, another part, or a combination thereof of the historical mobility data to provide to the service provider.

20 Claims, 12 Drawing Sheets

METHOD AND APPARATUS FOR PROVIDING SELECTED ACCESS TO USER MOBILITY DATA BASED ON A QUALITY OF SERVICE

BACKGROUND

Service providers typically have relied on access to potentially privacy-sensitive user data to provide services or applications to consumers. For example, delivery services may need to access to at least a user's address to determine where to make a delivery. If the service provider has access to even more user information such as the user's mobility data (e.g., data indicating a history of user movements or locations), the service provider may be able to provide an even higher level of service (e.g., by automatically selecting the time and/or location at which the user may be available to receive a delivery). However, providing access to privacy-sensitive user data historically has been an all or nothing option with the user either allowing or not allowing access his or her data by the service provider without consideration of effects on the quality of service that the user is to receive. Accordingly, service providers face significant technical challenges to enable users to more easily balance user privacy against the quality of service that the user is provided.

SOME EXAMPLE EMBODIMENTS

Therefore, there is a need for providing user control of historical mobility data access by a third party application and/or service relative to a quality of a service to be delivered to the user.

According to one embodiment, a computer-implemented method comprises receiving a request from a user to receive a service from a service provider. A quality of service of the service is dependent on historical mobility data associated with the user. The method also comprises determining a first part of the historical mobility data that is to be provided to the service provider to receive the service. The method further comprises determining a second part of the historical mobility data that is predicted to increase the quality of service of the service. The method further comprises providing a user interface for the user to select between the first part, the second part, another part, or a combination thereof of the historical mobility data to provide to the service provider.

According to another embodiment, an apparatus comprises at least one processor, and at least one memory including computer program code for one or more computer programs, the at least one memory and the computer program code configured to, with the at least one processor, cause, at least in part, the apparatus to receive a request from a user to receive a service from a service provider. A quality of service of the service is dependent on historical mobility data associated with the user. The apparatus is also caused to determine a first part of the historical mobility data that is to be provided to the service provider to receive the service. The apparatus is further caused to determine a second part of the historical mobility data that is predicted to increase the quality of service of the service. The apparatus is further caused to provide a user interface for the user to select between the first part, the second part, another part, or a combination thereof of the historical mobility data to provide to the service provider.

According to another embodiment, a non-transitory computer-readable storage medium carries one or more sequences of one or more instructions which, when executed by one or more processors, cause, at least in part, an apparatus to receive a request from a user to receive a service from a service provider. A quality of service of the service is dependent on historical mobility data associated with the user. The apparatus is also caused to determine a first part of the historical mobility data that is to be provided to the service provider to receive the service. The apparatus is further caused to determine a second part of the historical mobility data that is predicted to increase the quality of service of the service. The apparatus is further caused to provide a user interface for the user to select between the first part, the second part, another part, or a combination thereof of the historical mobility data to provide to the service provider.

According to another embodiment, an apparatus comprises means for receiving a request from a user to receive a service from a service provider. A quality of service of the service is dependent on historical mobility data associated with the user. The apparatus also comprises means for determining a first part of the historical mobility data that is to be provided to the service provider to receive the service. The apparatus further comprises means for determining a second part of the historical mobility data that is predicted to increase the quality of service of the service. The apparatus further comprises means for providing a user interface for the user to select between the first part, the second part, another part, or a combination thereof of the historical mobility data to provide to the service provider.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing user control of historical mobility data access by a third party application and/or service related to a quality of a service to be delivered to the user are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
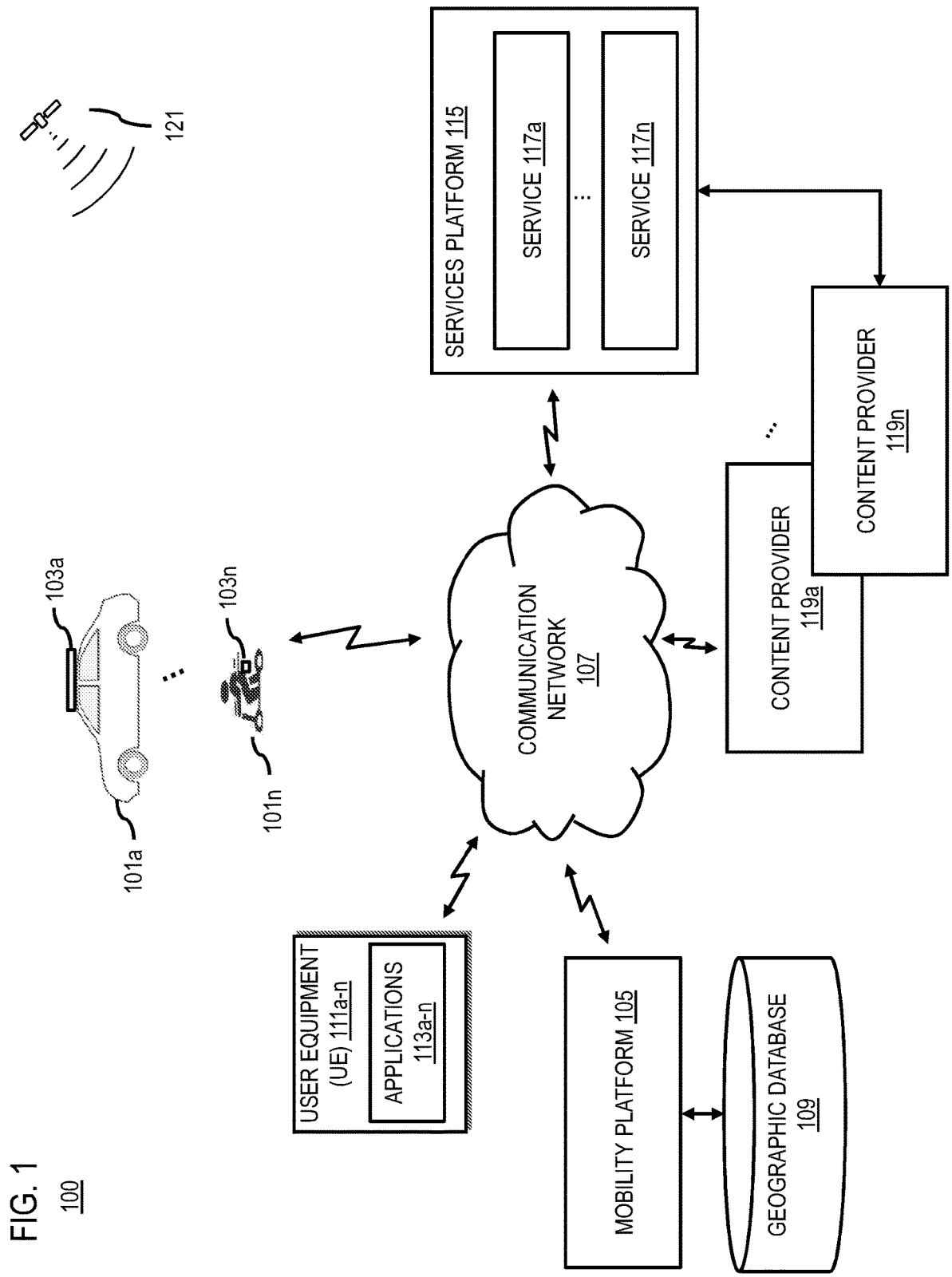
FIG. 1 is a diagram of a system capable of providing user control of historical mobility data access by a third party application and/or service related to a quality of a service to be delivered to the user, according to one embodiment.

FIG. 1 is a diagram of a system capable of providing user control of historical mobility data access by a third party application and/or service related to a quality of a service to be delivered to the user, according to one embodiment. Information of a user location history or insights related to a user's mobility patterns (e.g., mobility data) can be found via, for instance, location data (e.g., Global Positioning System (GPS) or equivalent data) recorded by a user device and/or a vehicle, other sensor data from user devices and/or vehicles, IP addresses of Wi-Fi access points, cell towers, and/or Bluetooth-enabled devices of other users and/or entities, private, public, and/or national surveillance systems (e.g., via cameras, satellites, internet, etc.), social media location check-in data, etc. However, many users find that this location or mobility data highly private and personal and may be reluctant to share this data with a third party application and/or service.

By way of example, navigation systems can provide route guidance to and from a destination via various means or mode of transportation, and collect user location history or mobility data. For example, when a user requests a navigation route to a restaurant, a navigation routing engine suggests and records user location history data, such as the actual route(s), and mode(s) of transport used to get to the restaurant, a parking location, the time of arrival, a time staying in the restaurant, etc. However, when a user desires to use a third party application and/or service, which may request to use at least a portion of the user location history or mobility data to provide a requested service or service task, the user may not have an understanding of how the third party application and/or service intends to use the mobility data or an understanding of what impact access to the mobility data may have on a level or quality of service that is to be provided to the user.

As a result users, tend to either: (1) grant no access to the mobility data, in which case the quality of service may be reduced; or (2) grant full access to the mobility data, in which case privacy sensitive data may exposed unnecessarily or without the user's full understanding of the impact of providing such access. For example, the choice of no access may not be feasible, since it may result in a lower level of service or, in some cases, may even disable the third party application and/or service from providing the requested service or service task. On the other hand, the choice of full access unnecessarily expose the user's personal data to the third party application and/or service. Therefore, service providers face technical challenges with respect to automatically managing or otherwise conveying to the user to how access to the user's mobility data may impact service quality.

To address these technical problems, a system 100 of FIG. 1 introduces a capability to provide user control of historical mobility data access by a third party application and/or service related to a quality of a service to be delivered to the user, according to one embodiment. In one embodiment, the system 100 retrieves user historical mobility data from user device sensor data, vehicle data (e.g., user historical mobility data and/or real-time information), etc., and builds a user mobility pattern model and/or matrix to optimize a quality of service. In one instance, the system 100 can gather all user mobility data in order to generate the user mobility pattern model and/or matrix. By way of example, the insights may include when and where the user travel to a location, and the used mode(s) of transport (i.e., checked-out); when and where each mode of transport is released (i.e., checked-in); how long the user stays at a given location; where the user is located within the threshold proximity to a point of interest (e.g., restaurant, supermarket, park, etc.) at a given time; correlations that can be made relative to other factors such as weather, events, day of the week, etc.

In another instance, the system 100 may determine or cluster the relevant mobility related information and/or vehicle data for a given user in one or more ways. In one embodiment, the system 100 can gather all the vehicle data and/or mobility related insights in relation to the user. It is contemplated that while clustering data for a given area may be slightly less accurate than clustering data in relation to a point of interest, clustering data for a given area would have the advantage to be computed and maintained once for all areas (and not separately maintained for all existing POIs like in the geofenced area approach).

In one embodiment, the system 100 processes the user historical mobility data to compute insights related to the user mobility patterns. For example, the system 100 can determine the following insights from the example user historical mobility data relative to some locations (e.g., points of interest).

By way of example, when the service is a delivery service, the optimization parameter is a delivery time, and the user requires a service or service task from a third party application and/or service, the system 100 determines which part of user historical mobility data and/or the user mobility pattern model and/or matrix is relevant for the service or service task to be provided (e.g., a delivery location and a delivery time frame), and which part of user historical mobility data and/or the user mobility pattern model and/or matrix is needed by a service provider to increase a quality of service (e.g., an earlier estimated delivery time of a good).

The system 100 provides a user interface for the user to select between the first part, the second part, another part, or a combination thereof of the historical mobility data to provide to the service provider. In another embodiment, the system 100 computes the optimal delivery option based on a cost function including delivery cost function parameters such as time, distance, fuel efficiency, etc. For example, the optimal delivery option satisfies the requesting user's criteria (such as cost less than $15).

The system 100 allows users to optimize delivery time, distance, and/or cost by considering the most efficient and cost effective combination of all possible delivery options (including custom delivery, same day delivery, next day delivery, regular delivery, etc.). The system 100 optimizes service delivery via further considering contextual factors such as traffic, user preference of mode of transport and location, weather, etc.

Optimal, for instance, refers to a combination of pick-up or delivery service quality parameters (e.g., SERVQUAL dimensions) that enables the service to reach a user with a time, distance, cost, etc. that meets threshold requirements or is a minimum among calculated candidate delivery options. The SERVQUAL dimensions include reliability, assurance/security, tangibles/perception, empathy, and responsiveness. There are other parameters developed more recently, such as timeliness, condition/accuracy of order, quality and availability of information (information about the company and the proposal, fixed working hours, the location of the collection points, ease of contact, etc.), availability/quality of personnel (e.g., staff politeness), reasonable and formal charges, client service, communication with clients, willingness and commitment to the search for solutions to problems/empathy, lack of delivery damage, small number of compliments, complexity of proposal, service price, service availability, flexibility to handle the delivery in terms of time and place, ability to take advantage of additional service (notification of receipt by text message or email, charges on delivery, written proof of delivery, etc.), comprehensive service—the ability to use the accompanying services (receipt of the waste, packaging, package pick-up, full logistics service, etc.), service individualization (proposal matching to the needs of a specific client or industry), modern technology (individual PUDO point near houses or apartments instead of boxes, drones or robots as couriers, etc.), tele-technologies (ICT, mobile apps, the ability to manage shipment tracking, the ability to generate reports, constant contact with the client, etc.), modern packaging solutions (the variety of packaging, packaging availability, possibility of packaging by courier, the aesthetics of packaging, packaging customization, etc.), competence and qualifications of the service provider (professionalism and preparation of the service provider, the knowledge, skills, etc.), staff politeness, trust (the credibility and reliability of the company, honesty, etc.), etc.

In one embodiment, the system 100 generates a recommended part of the historical mobility data to provide to the service provider to achieve on a target level for the quality of service, such as one the above-discussed quality of service parameters. The user interface presents a representation of the recommended part of the historical mobility data. The recommended part of the historical mobility data is a minimum amount of the historical mobility data is computed to achieve the target level for the quality of service.

By way of example, the user orders a fresh fruit basket via an e-commerce website. The standard delivery time is 5-7 days; however, the user would like to receive the fruit basket in 3 days without additional shipping cost. The system 100 predicts based on a user mobility pattern model and/or matrix that the user will be attending events at various locations in the coming 3 days, such as at home, at office, in a conference center, at a concert, at a yoga studio, etc., and matches one of the locations (e.g., a yoga studio) as next to or nearby a fresh fruit basket store. The system 100 suggests the user to disclose to the e-commerce website a time period and a location of the user available in the yoga studio to set up a pick-up or delivery arrangement of the fresh fruit basket. As another example, the system 100 determines from the user mobility pattern model and/or matrix that the user goes to a cinema watching a movie once a week, and recommends the user to go to a cinema next to or nearby a fresh fruit basket store to go in order to optimize a delivery to such a place. In other words, the system 100 can recommend places to visit to optimize a delivery process.

In another embodiment, the user's visit to the yoga studio is determined based on the user regular class attendance data extracted from user probe data. In yet another embodiment, the user's visit to the yoga studio is determined based on an event registration by the user, an entry in the user's calendar, an email invitation and/or confirmation in the user's inbox, social media feeds, etc.

As another example, the user would like to order online several pairs of hiking boots of different sizes via a vendor's website, to try all pairs together to decide which pair fits best, and to return the remaining pairs immediately. The standard delivery time is 5 days, but the user needs to use the boots in 2 days. The system 100 determines based on a user mobility pattern model and/or matrix that the user can perform all the actions at various locations in the coming 2 days, such as at home, at a hotel, at a restaurant, a transport terminal, etc., and matches one of the locations (e.g., a transport terminal) as next to or nearby an e-commerce PickUpDropOff (PUDO) point. The system 100 suggests the user to disclose to the e-commerce website a time period and a location of the user available in the transport terminal to set up a pick-up or delivery arrangement of the hiking boots. The system 100 thus provides user control of historical mobility data access by a third party application and/or service (e.g., an e-commerce server/vendor) related to a quality of a service to be delivered to the user.

In these examples, a precision, an accuracy, or a combination thereof of the prediction of the delivery time, the delivery location, or a combination is based on an amount of the historical mobility data that is provided to the service provider. The prediction is computed with respect to a designated time frame.

The historical mobility data is used to compute a prediction of the delivery time, a delivery location, or a combination thereof for the delivery service. In one embodiment, the system 101 computes impact data on the quality of service for a plurality of shared amounts of the historical mobility data. By way of example, the system 100 calculates a sharing of a location address and user available time frame at the location as accounting for 1% of the user historical mobility data, which can increase the precision of delivery time to 75%, and can provide an early delivery by 55%, etc. The user interface can present a representation of the impact data on the quality of service for user selection. The system 100 receives an input for specifying an optimization parameter for determining the quality of service.

In one embodiment, the user interface provides an option for the user to make a selection of the first part, the second part, or the another part of the historical mobility data applicable to only the user request or applicable to at least one subsequent request.

In one embodiment, the system 100 of FIG. 1 may include one or more vehicles 101a-101n (also collectively referred to herein as vehicles 101) configured with one or more vehicle sensors 103a-103n (also collectively referred to herein as vehicle sensors 103) having connectivity to a mobility platform 105 via a communication network 107. In one embodiment, the vehicles 101 are public transport, shared vehicles (e.g., shared cars, shared bikes, shared scooters, shared rollers, etc.), etc. In one instance, the shared vehicles are autonomous or semi-autonomous transport vehicles that can sense their environments and navigate without driver or occupant input via the vehicle sensors 103. Although the vehicles 101 are depicted as automobiles, e-scooters, etc., it is contemplated that the vehicles 101 may be any type of transportation. In one instance, the user historical mobility data (e.g., user historical mobility data and/or real-time information) is based on vehicle information or data stored in or accessible via a geographic database (e.g., the geographic database 109), a digital map, or a combination thereof, since the user took the vehicles to various locations.

In one embodiment, the system 100 surfaces or presents the first part, the second part, another part, or a combination thereof of the historical mobility data to a user via one or more user equipment (UE) 111a-111n (also collectively referred to herein as UEs 111) (e.g., a mobile device, a smartphone, etc.). In one instance, the UEs 111 include one or more applications 113a-113n (also collectively referred to herein as applications 113) (e.g., a mapping application, a navigation application, a review or recommendation application, etc.).

In one instance, the presentation of the mobility pattern data by the system 100 to a user may lead the user to adapt their own mobility patterns, thus impacting the delivery service and the relevant quality of service. For example, if a user sees that the he or she plays tennis four times a week and averagely spending 15 minutes to look for parking around the neighborhood, the user may decide to reach the tennis court by public transit or by shared vehicles, reducing the number of visits per week, etc. However, when the system 100 determines that the most suitable moment and place to deliver a package is the tennis court, the system 100 may recommend the user to adapt her/his mode of transport from public transit to a car in order to be able to carry the package, e.g., a flat screen TV.

In another instance, a user may see that a frequently visited POI (e.g., a restaurant) has newly available (possibly sponsored) shared vehicles (e.g., cars/bikes, etc.) that are reserved for their customers to reach the next destination. By way of example, the reserved shared vehicles may be in a "reserved" or "paying" state by the POI owner and released for a specific customer when needed. The system 100 presents such offer of amenities to the user, which may lead a user to select to disclose the user's usual destination after lunch at the restaurant, i.e., the user's office address, and to adapt their own mobility patterns from driving to taking a shared vehicle to the restaurant.

In one embodiment, the system 100 can personalize the one or more mobility insights to be surfaced to a user. For example, by default, the system 100 can make generic comments on the available shared vehicles if a user is not logged in to the system 100 (i.e., is not known). However, in one embodiment, if the system 100 knows the user, it would be able to know the user historical mobility data and which transport services the user is registered to or with (e.g., subway service, 2 bike sharing companies, 2 scooter sharing companies, and one car sharing company) and therefore, generates a personalized routing recommendation and/or optimal delivery option(s) based on such user mobility information or knowledge.

In one instance, the system 100 can recommend a new delivery place to a user by combining known mobility patterns of the user (i.e., a mobility model/matrix) and mobility insights related to a POI. For example, a user may generally use public transport, hence the places she or he regularly visits are in the vicinity of public transport stations. As a result, the system 100 could suggest delivery pick-up and/or drop-off places to the user based on the user's general mobility patterns (e.g., the user travels a maximum of 25 minutes to and from a place using public transport). In one instance, the system 100 could generate a recommendation for a new PUDO point within the bus terminal, particularly when the system 100 knows that there should be available buses at the time she or he usually goes to pick up breakfast bread in the bakery in the same bus terminal after work.

The system 100 determines what the user is planning to optimize for, in relation to a given service (e.g. a delivery time) and one or more relevant quality of service, collects and/or analyzes the user mobility data for the user, extracts the insights/model/matrix and value related to those mobility data, applies those insights/model/matrix to the service, and suggests the minimally intrusive mobility data to be shared to achieve the user target. In one embodiment, the system 100 defines a sharing scale related to the user mobility data so that the user can visualize the impact from sharing 0%-100% of the user's mobility data.

The system 100 enables a user to get some insights about the likelihood that one or more delivery options will be around the locations (e.g., points of interest) that they plan to visit (e.g., a restaurant), which is not possible to know by the user alone due to missing data. Similarly, if a user is more interested in discovering new delivery options which are convenient to reach or to be reached and meet entrain quality of service levels, the system 100 can also generate recommendations for such places based on the historical mobility data that the user will be there at the relevant times. Consequently, the system 100 allows a user to control the amount of mobility related data shared with a given software or service provider, in conjunction with a quality of service to be provided, while maintaining as much as possible mobility data privacy. The system 100 enables the sharing of the user mobility data under given controlled circumstances for which the user would decide to opt-in, in regard to the value (e.g., a desire quality of service) the user will get in return.

The product delivery service is used as an example. The system 100 can apply the various embodiment to other services (e.g., cleaning services, repair/maintenance services, etc.), involving two or more parties need to be synchronized in space and time.

Figure 2:
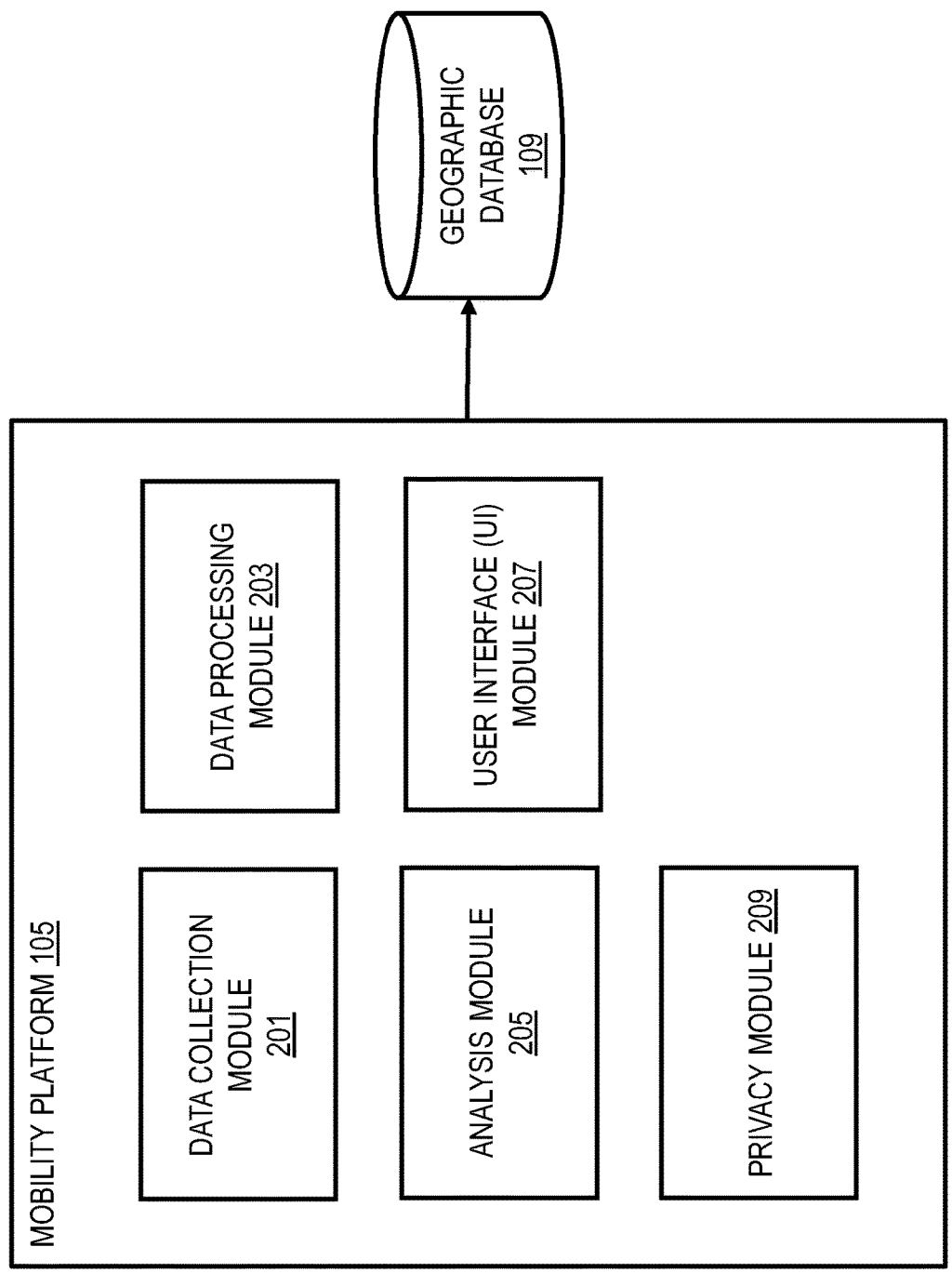
FIG. 2 is a diagram of the components of a mobility platform, according to one embodiment.

FIG. 2 is a diagram of the components of the mobility platform 105, according to one embodiment. By way of example, the mobility platform 105 includes one or more components for providing user control of historical mobility data access by a third party application and/or service related to a quality of a service to be delivered to the user. It is contemplated that the functions of these components may be combined in one or more components or performed by other components of equivalent functionality. In one embodiment, the mobility platform 105 includes a data collection module 201, a data processing module 203, an analysis module 205, a user interface (UI) module 207, and a privacy module 209 with connectivity to the geographic database 109. The above presented modules and components of the mobility platform 105 can be implemented in hardware, firmware, software, or a combination thereof. Though depicted as separate entities in FIG. 1, it is contemplated that the mobility platform 105 may be implemented as a module of any of the components of the system 100. In another embodiment, the mobility platform 105 and/or one or more of the modules 201-209 may be implemented as a cloud-based service, local service, native application, or combination thereof. The functions of the mobility platform 105 and/or the modules 201-209 are discussed with respect to FIGS. 3 and 4 below.

In one embodiment, the data collection module 201 retrieves user historical mobility data and/or real-time information, wherein the user historical mobility indicates one or more user travel events that have occurred, that are occurring at a given time, or a combination thereof to a location. By way of example, the user historical mobility data includes historical vehicle data, includes when and where a vehicle (e.g., a mode of public transport, a shared car, a shared bike, or a shared scooter) is taken (i.e., checked-out); when and where the vehicle is released (i.e., checked-in); how long the shared vehicle stayed at a given location within the proximity to the location; and a correlation to a contextual parameter. By way of example, the real-time information may include where a vehicle is located within the threshold proximity to the location at a given time (e.g., in real-time or substantially real-time). In one example, the contextual parameter may include factors like weather, events, day of the week, etc. In one embodiment, the data collection module 201 retrieves user historical mobility data and/or real-time information (e.g., the vehicle data) from information or data stored in or accessible via a geographic database (e.g., the geographic database 109), a digital map, or a combination thereof. In one instance, a location may be any place (e.g., a restaurant, a theater, a sports or an entertainment venue, etc.) that a user visited.

In one embodiment, the data processing module 203 processes the user historical mobility data to determine mobility pattern data, wherein the mobility pattern data includes a user mobility pattern, a vehicle mobility pattern, or a combination thereof under one or more contexts for travel to or from a plurality of locations. By way of example, the data processing module 203 processes the user's probe data in various dot lines into presence clusters in FIG. 3.

In one embodiment, the data processing module 205 can determine delivery option(s) and organize the delivery service based on mobility pattern data.

In another embodiment, the data processing module 203 can determine the mobility pattern data with respect to a vehicle type (e.g., a bus, a car, a bicycle, a scooter), a vehicle operator (e.g., Company A, Company B, Company C, etc.), or a combination thereof. As results, the data processing module 205 can determine delivery option(s) and organize the delivery service further based on their respective vehicle availability and/or operability (e.g., standard, autonomous, semi-autonomous, etc.).

In one embodiment, the UI module 207 presents the mobility pattern data to a user in a location-based user interface. By way of example, the location-based user interface may be a mapping application, a navigation application, a review or recommendation application, etc. of a UE such a mobile device, a smartphone, etc. In one embodiment, the UI module 207 presents the data in the location-based user interface as one or more distributions of shared vehicle availability.

Figure 3:
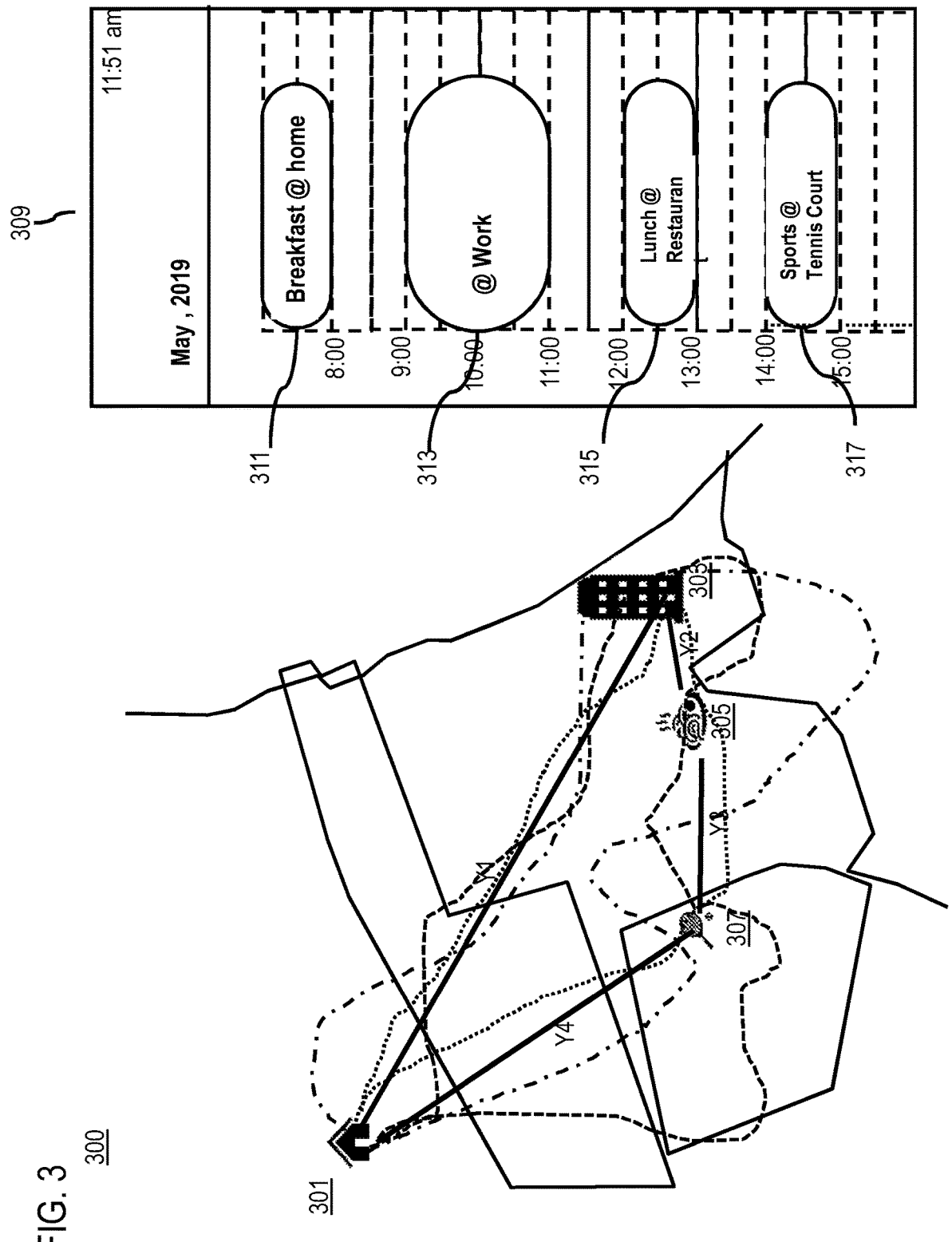
FIG. 3 is a diagram of a user interface used in the process for presenting a monthly spatial-temporal mobility pattern of a user based on user historical mobility data, according to one embodiment.

FIG. 3 is a diagram of a user interface used in the process for presenting a monthly spatial-temporal mobility pattern of a user based on user historical mobility data, according to one embodiment. FIG. 3 depicts in a user interface 300 that includes a map view of the locations where the user visited during May 2019 on the left and a calendar view of the user's presence clusters during different times of the weekday on the right. The map view shows the user was usually at the user's home 301, traveled to the user's office 303 via a road segment Y1, traveled to a restaurant 305 via a road segment Y2, traveled to a tennis court 307 via a road segment Y3, and then traveled back to home 301 via a road segment Y4. The calendar view includes a month box 309 (e.g., May 2019), four user presence clusters, including an cluster 311 of eating breakfast at home during 7:00-8:00 am, a cluster 313 of at work during 9:00-11:00 am, a cluster 315 of eating lunch at a restaurant during 12:00-13:00, and a cluster 317 of playing tennis at a tennis court during 14:00-15:00.

Figure 4:
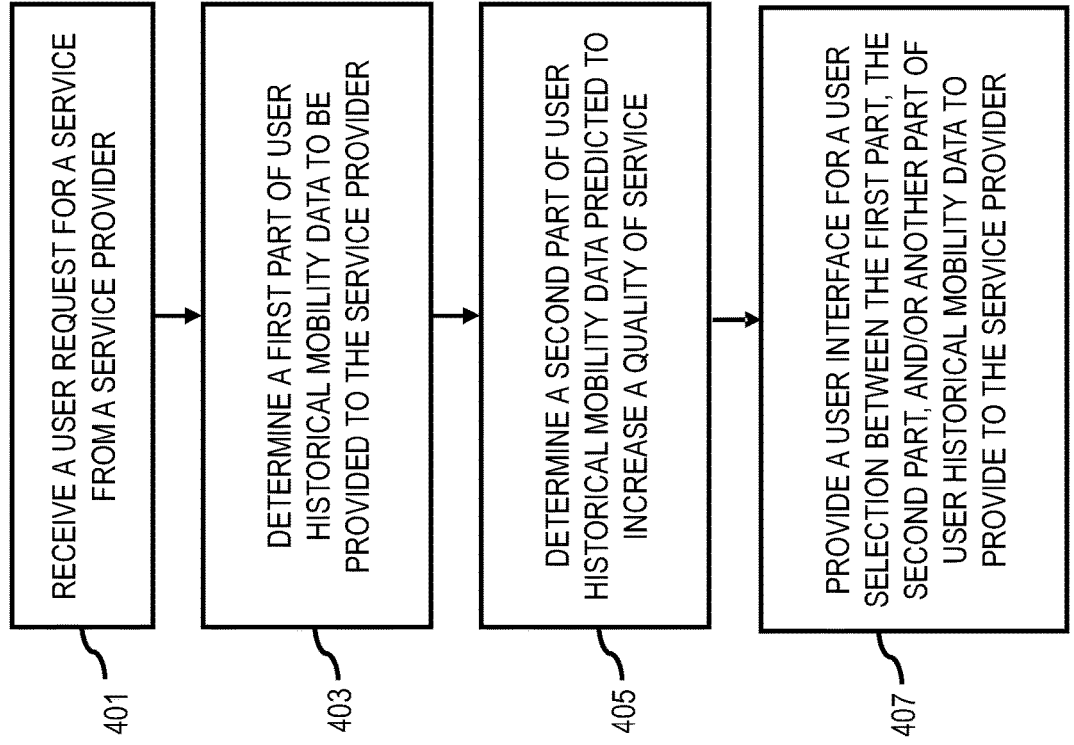
FIG. 4 is a flowchart of a process for providing user control of historical mobility data access by a third party application and/or service related to a quality of a service to be delivered to the user, according to one embodiment.
Figure 10:
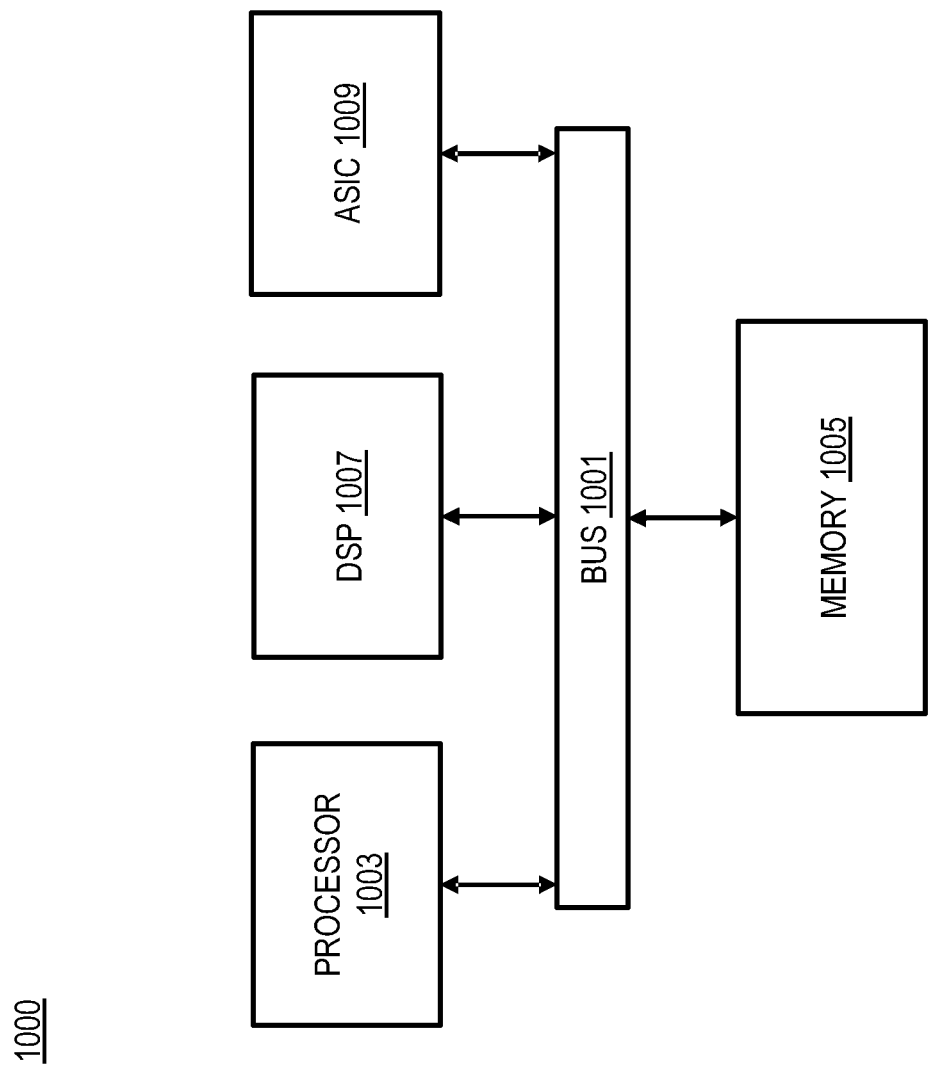
FIG. 10 is a diagram of a chip set that can be used to implement an embodiment.

FIG. 4 is a flowchart of a process for providing user control of historical mobility data access by a third party application and/or service related to a quality of a service to be delivered to the user, according to one embodiment, according to one embodiment. In various embodiments, the mobility platform 105 and/or the modules 201-209 may perform one or more portions of the process 400 and may be implemented in, for instance, a chip set including a processor and a memory as shown in FIG. 10. As such, the mobility platform 105 and/or modules 201-209 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the privacy module 209 receives a request from a user to receive a service from a service provider, wherein a quality of service of the service is dependent on historical mobility data associated with the user.

Figure 5:
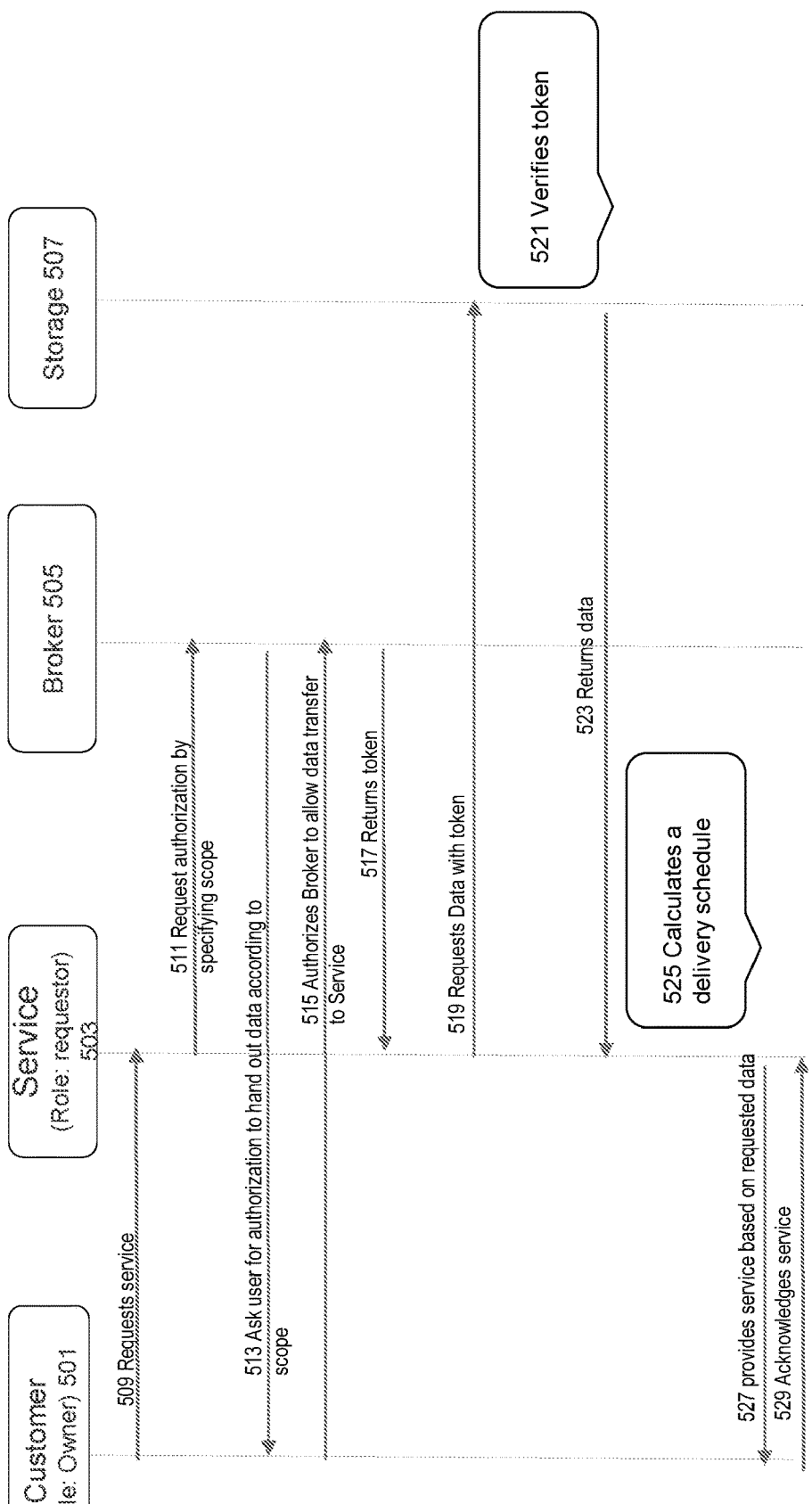
FIG. 5 is a sequence diagram that represents a user privacy control flow, according to one example embodiment.

FIG. 5 is a sequence diagram that represents a user privacy control flow, according to one example embodiment. In interaction 509, a customer/user 501 (i.e., owner of the personal data) may request for a service 503 (i.e., a user data requester) which in turn requests user data to provide the requested service to customer 501. In interaction 511, the service 503 thus sends to a broker 505 a request for authorization certain user data (e.g., specifying a data scope). The broker 505 is interchangeable with the privacy module 209 that manages user data requests by the service/requestor 503.

In interaction 513, the broker 505 asks the user for authorization to hand out user data according to the scope. In one embodiment, the privacy module 209 instructs the UI module 207 to provide a user interface for the user to approve the required user data scope. In another embodiment, the privacy module 209 instructs the UI module 207 to provide a user interface for the user to select between the first part, the second part, another part, or a combination thereof of the historical mobility data to provide to the service provider (step 407 in FIG. 4).

In interaction 515, the broker receives from the customer 501 an authorization to allow required data transfer to the service 505. In interaction 517, the broker sends to the service 505 a privacy token that grants the required data scope. The token is self-contained and contains all the information necessary for authentication. The servicer 505 then sends the data request with the privacy token to the storage 507 (i.e., a database) that stores the user data, in interaction 519. The storage 507 authenticates the service and the data request based on the token in interaction 521, and then sends the request data to the service 505 in interaction 523. The service 505 uses the request data to calculate a regular delivery schedule for the service requested by the customer 501, in interaction 525, and then delivers the requested service in interaction 527. The user 501 then acknowledges the service in interaction 529.

In step 403, the privacy module 209 determines a first part of the historical mobility data that is to be provided to the service provider to receive the service. In one embodiment, the requested service is a regular service, and the requested data is the first part of the historical mobility data that is to be provided to the service provider to receive the service, such as a delivery location and a standard delivery timeframe of 5-7 days.

In step 405, the privacy module 209 determines a second part of the historical mobility data that is predicted to increase the quality of service of the service. In another embodiment, the requested service is an enhanced service, and the requested data is the second part of the historical mobility data that is predicted to increase the quality of service of the service, such as a custom delivery location and/or a shorter delivery timeframe of 1-2 days.

The privacy module 209 can determine based on the user historical mobility data, the user mobility pattern model/matrix, or a combination thereof, where and when with the highest probability the user can be reached in the next two days, and recommends the user to select the optimal delivery option(s) accordingly.

In one embodiment, the privacy module 209 provides on the UI an option for the user to make a selection of the first part, the second part, or the another part of the historical mobility data applicable to only the user request or applicable to at least one subsequent request. For example, the privacy module 209 prompts the user to select "apply to this item", "apply to this order", "apply to all future orders", etc.

Figure 6A:
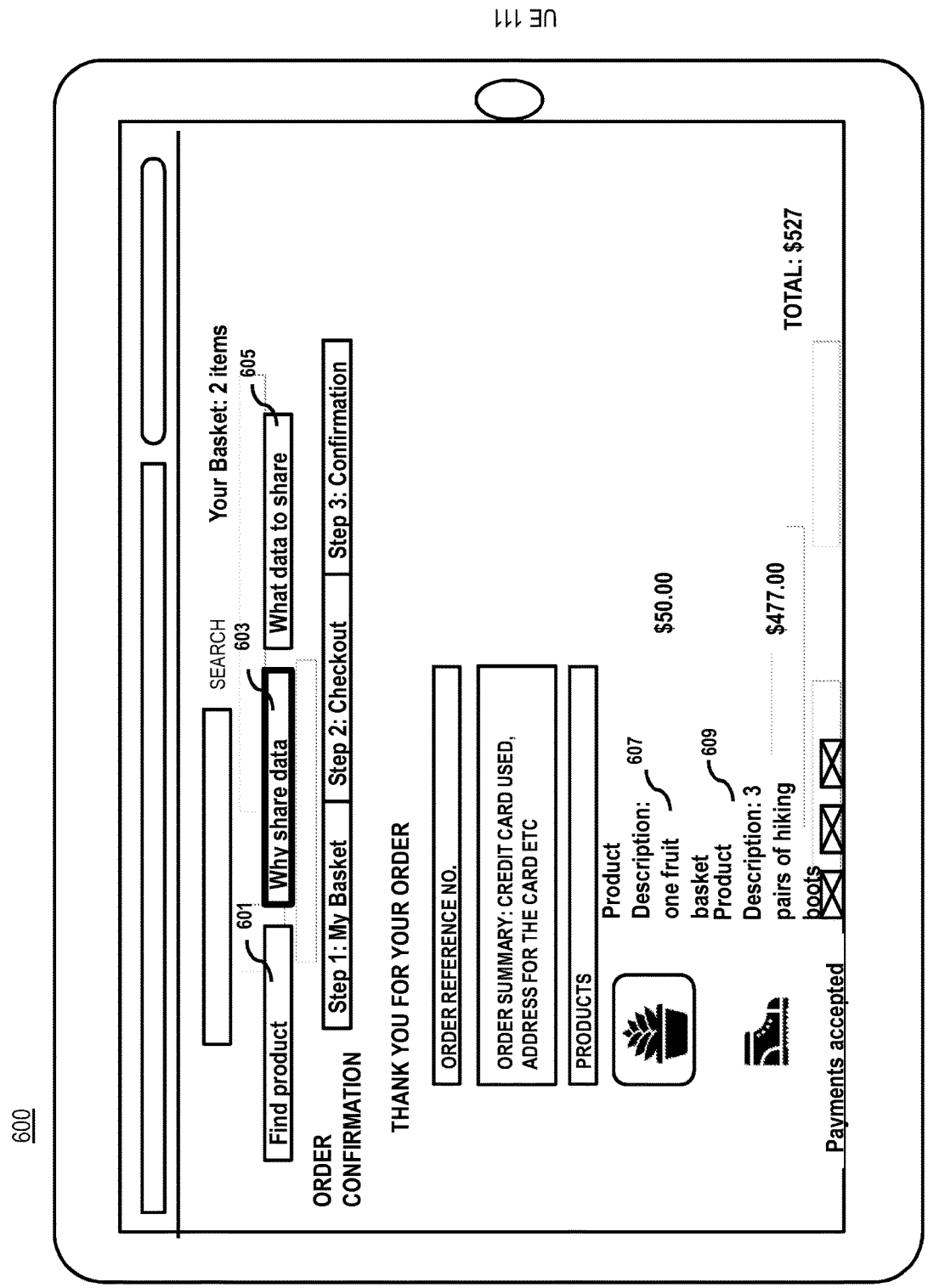
FIGS. 6A-6B are diagram of example user interfaces for providing user control of historical mobility data access by a third party application and/or service related to which quality of service, according to various embodiments.
Figure 6B:
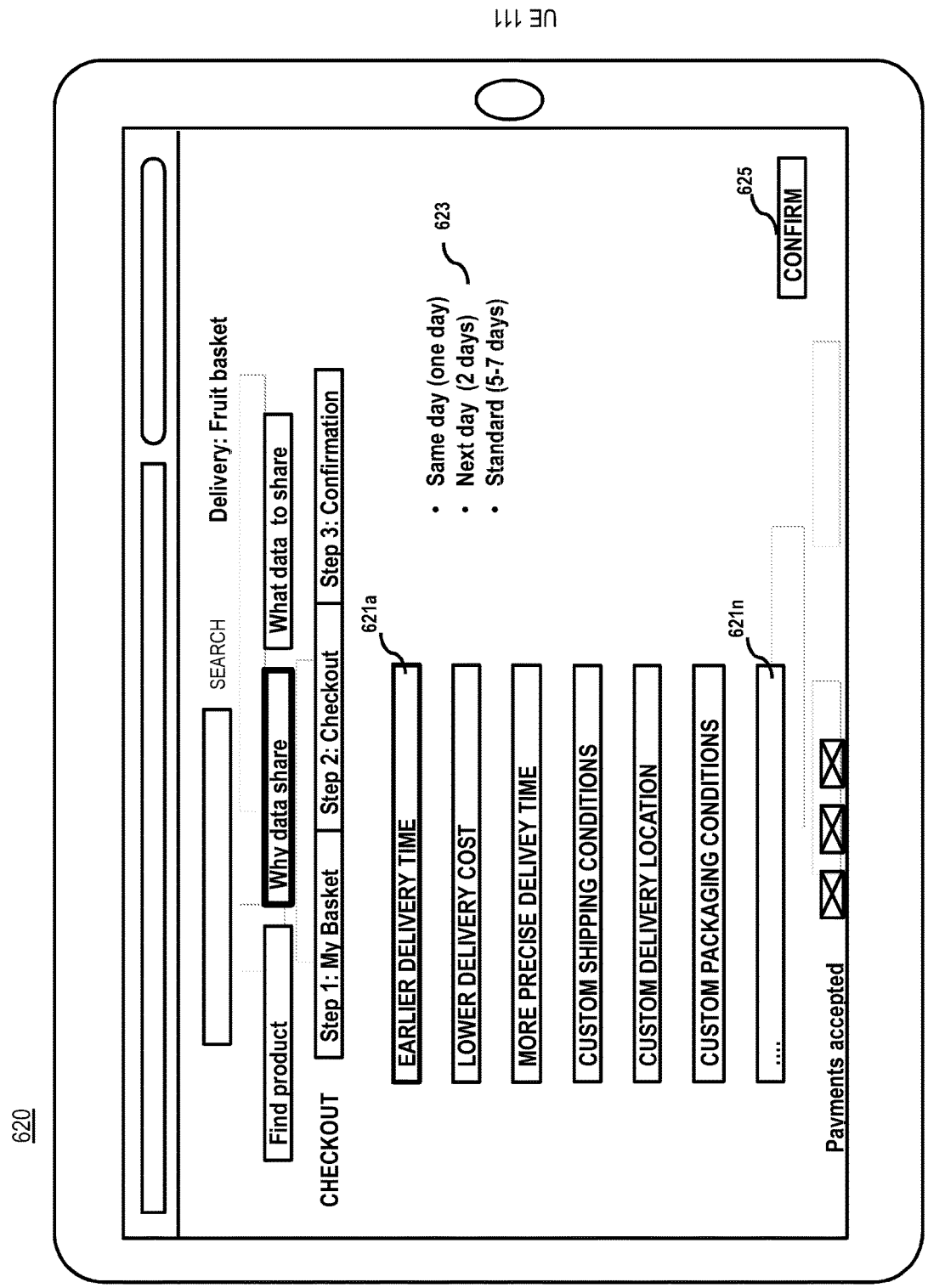

FIGS. 6A-6B are diagrams of example user interfaces for providing user control of historical mobility data access by a third party application and/or service related to which quality of service, according to various embodiments. In the user interface (UI) 600 of FIG. 6A, the user clicks a "Find product" button 601, and selects an order of a fresh fruit basket 607 and an order of three pairs of hiking boots 609 from a third party e-commerce website. In one embodiment, the mobility platform 105 generates a mobility data sharing widget which is a mashup of the e-commerce website and mobility data sharing functions to provide the UI 600. The user selects the order of a fresh fruit basket 607 and clicks a "Why share data" button 603, thus triggers a quality of service (Qos) menu 621 in the UI 620 of FIG. 6B. By way of example, the quality of service menu lists "earlier delivery time", "lower delivery cost", "more precise delivery time", "custom shipping conditions", "custom delivery location", "custom packaging conditions", etc. 621a-621n. In one embodiment, the mobility platform 105 receives an input for specifying an optimization parameter for determining the quality of service. By way of example, the user selects "earlier delivery time", so the mobility platform 105 provides a menu 623 listing various options, such as same day, next day, standard delivery time for the user to select then click a confirm button 525.

By way of example, the options for "more precise delivery time" may include "within 1-hr window", "within 3-hr window", etc. The options for "custom shipping conditions" may include "refrigerated under 18 C", "65-74% humidity", etc. The options for "custom delivery location" may include "concierge desk", "under porch", etc.

Figure 7:
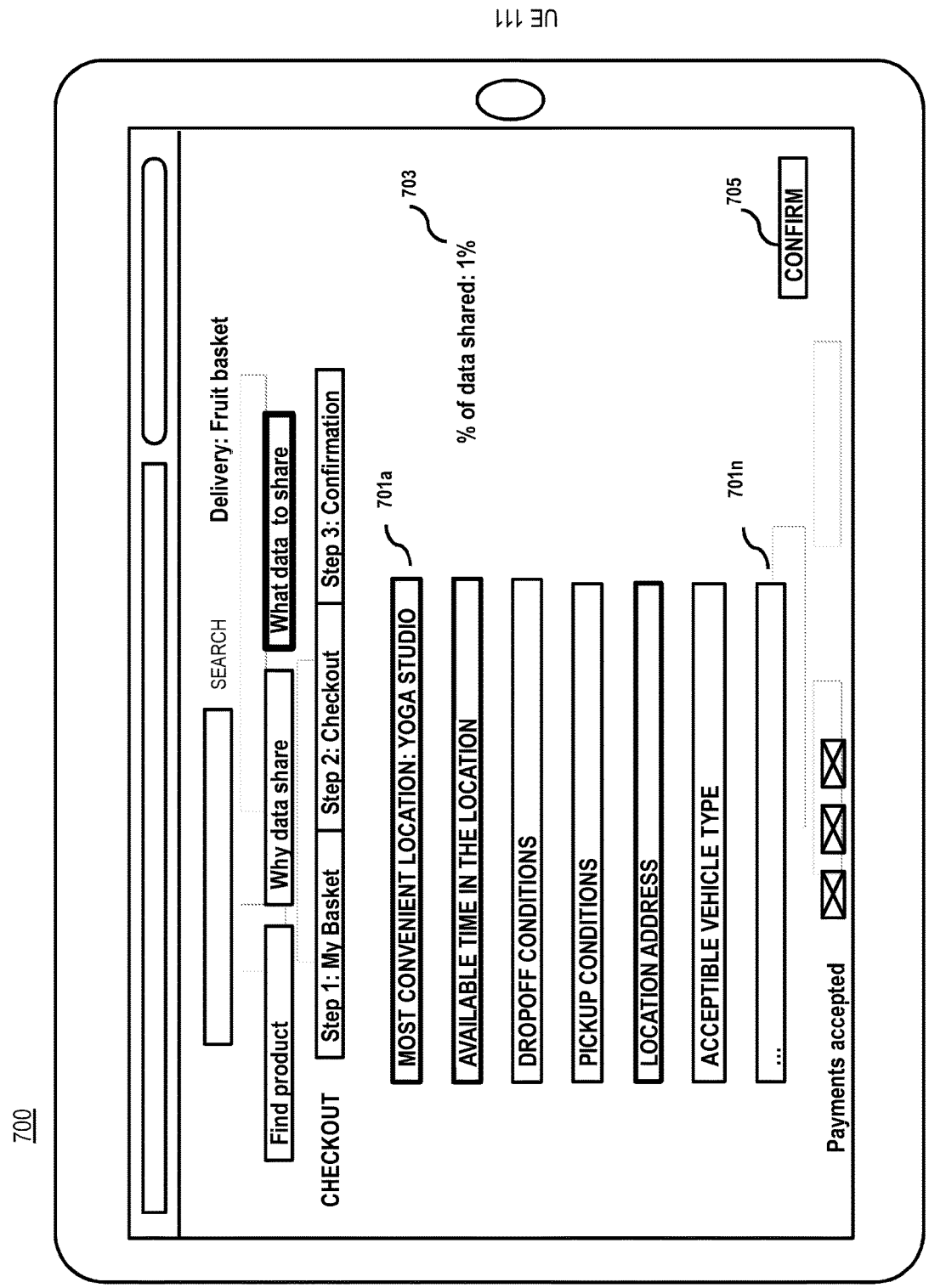
FIG. 7 is a diagram of an example user interfaces for providing user control of what historical mobility data to share with a third party application and/or service related to a quality of service to be delivered to the user, according to one embodiment.

FIG. 7 is a diagram of an example user interfaces for providing user control of what historical mobility data to share with a third party application and/or service related to a quality of service to be delivered to the user, according to one embodiment. In the user interface (UI) 700 of FIG. 7, the user clicks a "What data to share" button 603, and selects one or more of the listed data items 701a-701n to share with the e-commerce website, in order to obtain a desired quality of service, e.g., an earlier deliver time. By way of example, the data items include that the user accepts drone delivery at home.

The standard delivery time is 5-7 days; however, the user would like to receive the fruit basket in 3 days without additional shipping cost. The mobility platform 105 predicts based on a user mobility pattern model and/or matrix that the user will be attending events at various locations in the coming 3 days, such as at home, at office, in a conference center, at a concert, at a yoga studio, etc., and matches one of the locations (e.g., a yoga studio) as next to or nearby a fresh fruit basket store.

In one embodiment, the mobility platform 105 computes impact data on the quality of service for a plurality of shared amounts of the historical mobility data, then suggests the user to disclose to the e-commerce website at least the name and address of the yoga studio and a time period the user will be available in the yoga studio to set up a pick-up or delivery arrangement of the fresh fruit basket. The mobility platform 105 computes and displays a percentage of historical mobility data that is to be disclosed to the e-commerce website as 1% in a box 703, for example. The user can select a precision, an accuracy, or a combination thereof of the prediction of the delivery time, the delivery location, or a combination thereof is based on an amount of the historical mobility data that is provided to the service provider (e.g., 1%). By way of example, the prediction is computed with respect to a designated time frame. The mobility platform 105 proceeds with the data share after the user clicks a confirm button 705.

The above-discussed embodiments improve delivery services through the extraction of service relevant user mobility patterns, and restrict the access to user mobility related data to what is necessary to a desired quality of service.

The above-discussed embodiments combine different technologies (sensors, 3D routing, user mobility mapping, car and pedestrian routing algorithms, machine learning of mobility patterns, prediction of mobility models/matrix, real-time position tracking of the user and a delivery vehicle, fleet management, probability computation, risk computation, big data analysis, etc.) to provide least user mobility data in exchange for a quality of service.

Returning to FIG. 1, in one embodiment, the UEs 111 can be associated with any of the vehicles 101 (e.g., a shared vehicle) or a person traveling within a vehicle 101. By way of example, the UEs 111 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 111 can support any type of interface to the user (such as "wearable" circuitry, etc.). In one embodiment, the vehicles 101 may have cellular or wireless fidelity (Wi-Fi) connection either through the inbuilt communication equipment or from a UE 111 associated with the vehicles 101. Also, the UEs 111 may be configured to access the communication network 107 by way of any known or still developing communication protocols. In one embodiment, the UEs 111 may include the mobility platform 105 to provide user control of historical mobility data access by a third party application and/or service related to a quality of a service to be delivered to the user.

In one embodiment, the mobility platform 105 performs the process for providing user control of historical mobility data access by a third party application and/or service related to a quality of a service to be delivered to the user as discussed with respect to the various embodiments described herein. In one embodiment, the mobility platform 105 can be a standalone server or a component of another device with connectivity to the communication network 107. For example, the component can be part of an edge computing network where remote computing devices (not shown) are installed along or within proximity of an intended destination (e.g., a city center).

In one embodiment, the mobility platform 105 has connectivity over the communication network 107 to the services platform 115 (e.g., an OEM platform) that provides one or more services 117a-117n (also collectively referred to herein as services 117) (e.g., traffic/routing services). By way of example, the services 117 may also be other third-party services and include mapping services, navigation services, travel planning services, reservation services (e.g., booking a shared vehicle 101), notification services, social networking services, content (e.g., audio, video, images, etc.) provisioning services, application services, storage services, contextual information determination services, location-based services, information-based services (e.g., weather, news, etc.), etc. By way of example, the services 117 may be online services that reflect interests, recommendations, reviews, and/or activities of users. In one instance, the services 117 provide representations of each user (e.g., a profile), his/her social links, and a variety of additional information. In one instance, the services 117 can allow users to share location information, activities information, POI related information, contextual information, and interests within their individual networks, and provides for data portability.

In one embodiment, content providers 119a-19n (also collectively referred to herein as content providers 119) may provide content or data (e.g., navigation-based content such as destination information, routing instructions, POI related data, user historical mobility data; shared vehicle content such as vehicle type, vehicle operator; etc.) to the vehicles 101, the mobility platform 105, the geographic database 109, the UEs 111, the applications 113, the services platform 115, and the services 117. The content provided may be any type of content, such as map content, contextual content, audio content, video content, image content, etc. In one embodiment, the content providers 119 may also store content associated with the vehicles 101, the mobility platform 105, the geographic database 109, the UEs 111, the applications 113, the services platform 115, and/or the services 117. In another embodiment, the content providers 119 may manage access to a central repository of data, and offer a consistent, standard interface to data, such as a repository of the geographic database 109.

By way of example, as previously stated the vehicle sensors 103 may be any type of sensor. In certain embodiments, the vehicle sensors 103 may include, for example, a global positioning sensor (GPS) for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., lights or exhaust associated with a shared vehicle 101 that is no longer available for use (i.e., checked-out)), velocity sensors, and the like. In another embodiment, the vehicle sensors 103 may include sensors (e.g., mounted along a perimeter of the vehicle 101) to detect the relative distance of the vehicle from lanes or roadways, the presence of other vehicles 101, pedestrians, animals, traffic lights, road features (e.g., curves) and any other objects, or a combination thereof. In one scenario, the vehicle sensors 103 may detect weather data, traffic information, or a combination thereof. In one example embodiment, the vehicles 101 may include GPS receivers to obtain geographic coordinates from satellites 121 for determining current or live location and time. Further, the location can be determined by a triangulation system such as A-GPS, Cell of Origin, or other location extrapolation technologies when cellular or network signals are available. In another example embodiment, the services 117 may provide in-vehicle navigation services.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mobility platform 105 may be a platform with multiple interconnected components. By way of example, the mobility platform 105 may include multiple servers, intelligent networking devices, computing devices, components and corresponding software for providing user control of historical mobility data access by a third party application and/or service related to a quality of a service to be delivered to the user. In addition, it is noted that the mobility platform 105 may be a separate entity of the system 100, a part of the services platform 115, the one or more services 117, or the content providers 119.

In one embodiment, the geographic database 109 stores information regarding one or more shared vehicle events that have occurred within a threshold proximity of a POI, one or more mobility patterns or mobility graphs associated with a user, one or more user registrations with one or more shared vehicle operators, or a combination thereof. In one instance, the geographic database 109 can also store defined geofenced areas, static squared areas, slightly overlapping circles, or a combination thereof around a POI. The information may be any of multiple types of information that can provide means for providing user control of historical mobility data access by a third party application and/or service related to a quality of a service to be delivered to the user. In another embodiment, the geographic database 109 may be in a cloud and/or in a vehicle 101, a UE 111, or a combination thereof.

By way of example, the vehicles 101, the mobility platform 105, the geographic database 109, the UEs 111, the applications 113, the services platform 115, the services 117, the content providers 119, and the satellites 121 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
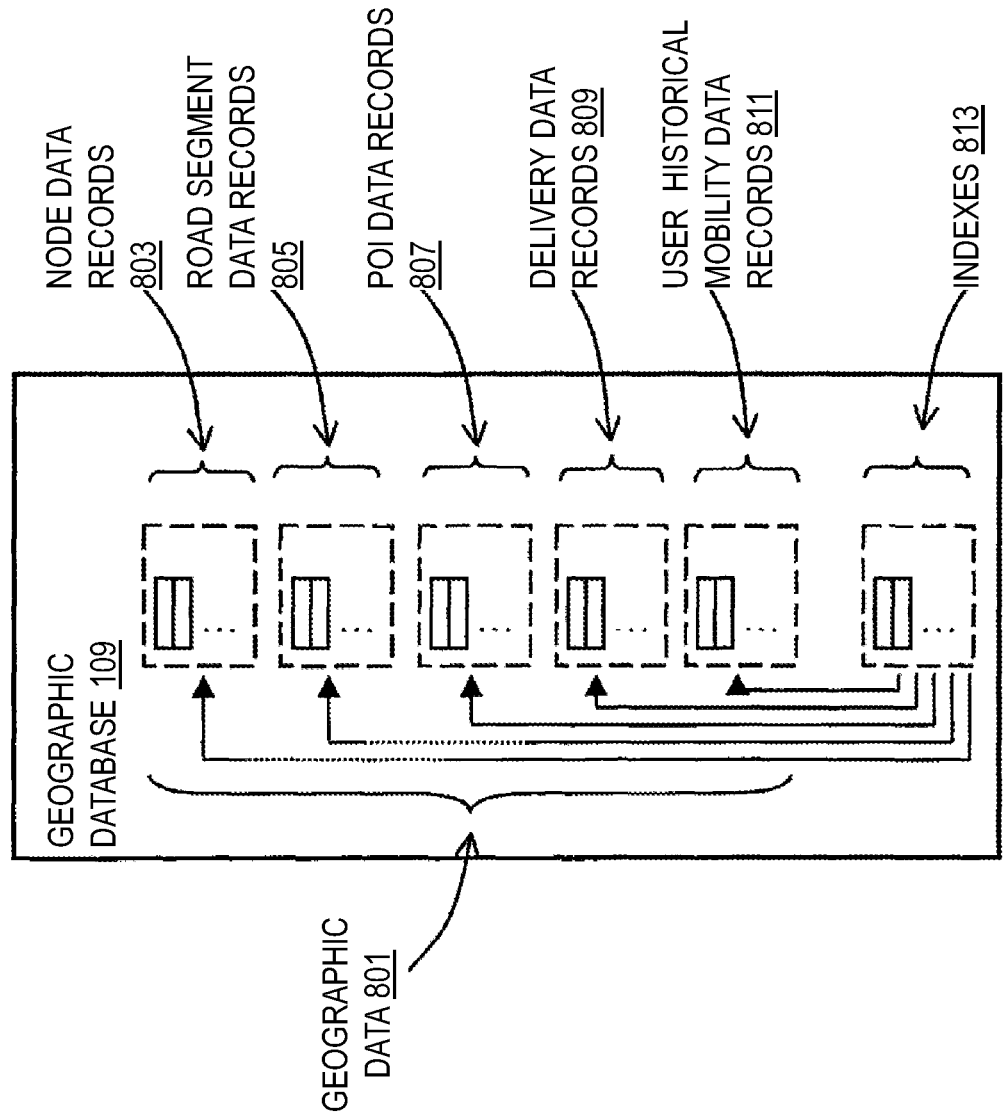
FIG. 8 is a diagram of a geographic database capable of storing map data for providing user control of historical mobility data access by a third party application and/or service related to a quality of service, according to one embodiment.

FIG. 8 is a diagram of a geographic database 113 capable of providing user control of historical mobility data access by a third party application and/or service related to a quality of a service to be delivered to the user, according to one embodiment. In one embodiment, the geographic database 113 includes geographic data 801 used for (or configured to be compiled to be used for) mapping and/or navigation-related services, such as for providing user historical mobility data to a third party application and/or service in exchange for a quality of service. In one embodiment, the delivery routing is executed a vehicle 101 to a target delivery location (e.g., a yoga studio) within a target time frame. For example, the geographic database 801 stores model data (e.g., 2D map data, 3D object models, etc.) among other related data.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 801 of the database 113 includes node data records 803, road segment or link data records 805, POI data records 807, delivery data records 809, user historical mobility data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 113. In one embodiment, the indexes 813 may be used to quickly locate data without having to search every row in the geographic database 113 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. In addition, the geographic database 113 can contain path segment and node data records or other data that represent paths around map features (e.g., terrain features, buildings, other structures, etc.) that on and above street level, such as when routing or representing flightpaths of aerial vehicles (e.g., drones), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 807. The geographic database 113 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 113 can also include the delivery data records 809 for the digital map data representing mapped the delivery locations, and/or any other related data as described in the embodiments above. For example, mobile mapping vehicles equipped with LiDAR and/or equivalent sensors can provide model data. In one embodiment, a digital map created from LiDAR, aerial/satellite-based 3D sensor data, and/or other 3D sensor data collected for a geographic area can store model data (e.g., 3D object models) of the digital map for facilitate drone package delivery. The digital map data can also be obtained with portable or smaller mapping devices/vehicles for mapping. In one embodiment, the delivery data records 809 can be associated with one or more of the node records 803, road segment records 805, and/or POI data records 807 so that the delivery data records 809 can inherit characteristics, properties, metadata, etc. of the associated records (e.g., location, address, POI type, etc.). In one embodiment, the system 100 (e.g., via the mobility platform 105 can use the additional characteristics, properties, metadata, etc. to generate delivery routes. In one embodiment, the delivery data records 809 can include a data layer for storing real-time data on the digital map to support delivery vehicles travel according to the embodiments described herein.

In one embodiment, the system 100 is capable of generating delivery routes using the digital map data and/or real-time data stored in the geographic database 113. The resulting routing and guidance can be stored in the delivery data records 809. By way of example, the routes stored in the delivery data records 809 can be created for individual 3D flightpaths or routes as they are requested by aerial vehicles or their operators. In this way, previously generated delivery routes can be reused for future aerial vehicle travel over to the same target location.

In one embodiment, the delivery data records 809 further include fleet data related to delivery, traffic data, parking data. In another embodiment, the routes stored in the delivery data records 809 can be specific to characteristics of the vehicle 101 (e.g., vehicle type, size, supported modes of operation) and/or other characteristics of the route. In addition, the routes generated according to the embodiments described herein can be based on contextual parameters (e.g., time-of-day, day-of-week, season, etc.).

In one embodiment, the geographic database 113 can also include the user historical mobility data records 811 for the digital map data representing mapped the user locations, and/or any other related data as described in the embodiments above. For example, the user's mobile devices equipped with GPS and/or equivalent sensors can provide user mobility data. In one embodiment, a user mobility pattern model and/or matrix is built from the user historical mobility data to optimize a quality of delivery service. The user mobility pattern model and/or matrix can also be obtained with probe data of vehicles that the user travelled on. In one embodiment, the user historical mobility data records 811 can be associated with one or more of the node records 803, road segment records 805, and/or POI data records 807 so that the user historical mobility data records 811 can inherit characteristics, properties, metadata, etc. of the associated records (e.g., location, address, POI type, etc.). In one embodiment, the user historical mobility data records 811 can include a data layer for storing real-time data on the digital map to support package receipt according to the embodiments described herein.

In one embodiment, the system 100 (e.g., via the mobility platform 105 can use the additional characteristics, properties, metadata, etc. to generate the user mobility pattern model and/or matrix. By way of example, the mobility data stored in the user historical mobility data records 811 can be specific to characteristics of the user (e.g., user profile, preferences, etc.) and/or other characteristics of the user. In addition, the user mobility pattern model and/or matrix generated according to the embodiments described herein can be based on contextual parameters (e.g., time-of-day, day-of-week, season, weather, etc.). In one embodiment, the user profile data includes, but not limited to, the name, name, login named, screen named, nicknamed, handle names, home addresses, email addresses, government identification numbers, operator license/credential types (motorcycle, regular passenger vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/records, criminal records, purchase records, financial data, activity records, employment records, insurance records, medical records, political and non-political affiliations, location preferences (e.g., POIs), calendar data, driving history data, vehicle sharing data, etc. of the driver/requesting user.

In one embodiment, the geographic database 113 can be maintained by the services platform 117 and/or any of the services 119 of the services platform 117 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ aerial vehicles (e.g., using the embodiments of the privacy-control process described herein) or field vehicles (e.g., mapping aerial vehicles or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the aerial vehicle 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing user control of what historical mobility data to share with a third party application and/or service related to a quality of service to be delivered to the user may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
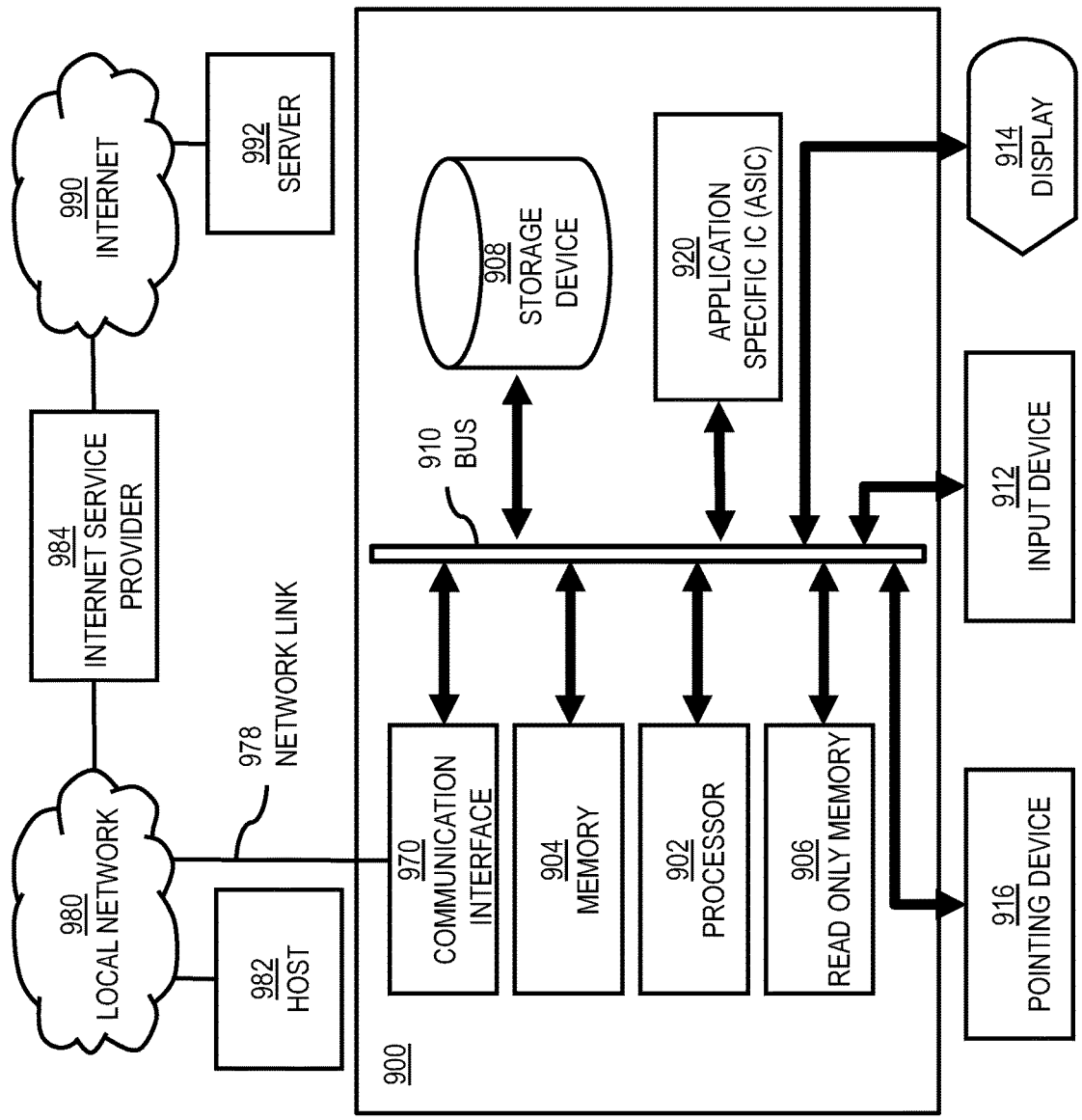
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to provide user control of what historical mobility data to share with a third party application and/or service related to a quality of service as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing user control of what historical mobility data to share with a third party application and/or service related to a quality of service to be delivered to the user. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing user control of what historical mobility data to share with a third party application and/or service related to a quality of service to be delivered to the user. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing user control of what historical mobility data to share with a third party application and/or service related to a quality of service to be delivered to the user, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 115 for providing user control of what historical mobility data to share with a third party application and/or service related to a quality of service to be delivered to the user.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide user control of what historical mobility data to share with a third party application and/or service related to a quality of service to be delivered to the user as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide user control of what historical mobility data to share with a third party application and/or service related to a quality of service to be delivered to the user. The memory 1005 also stores the data associated with or generated by the execution of the inventive steps.

Figure 11:
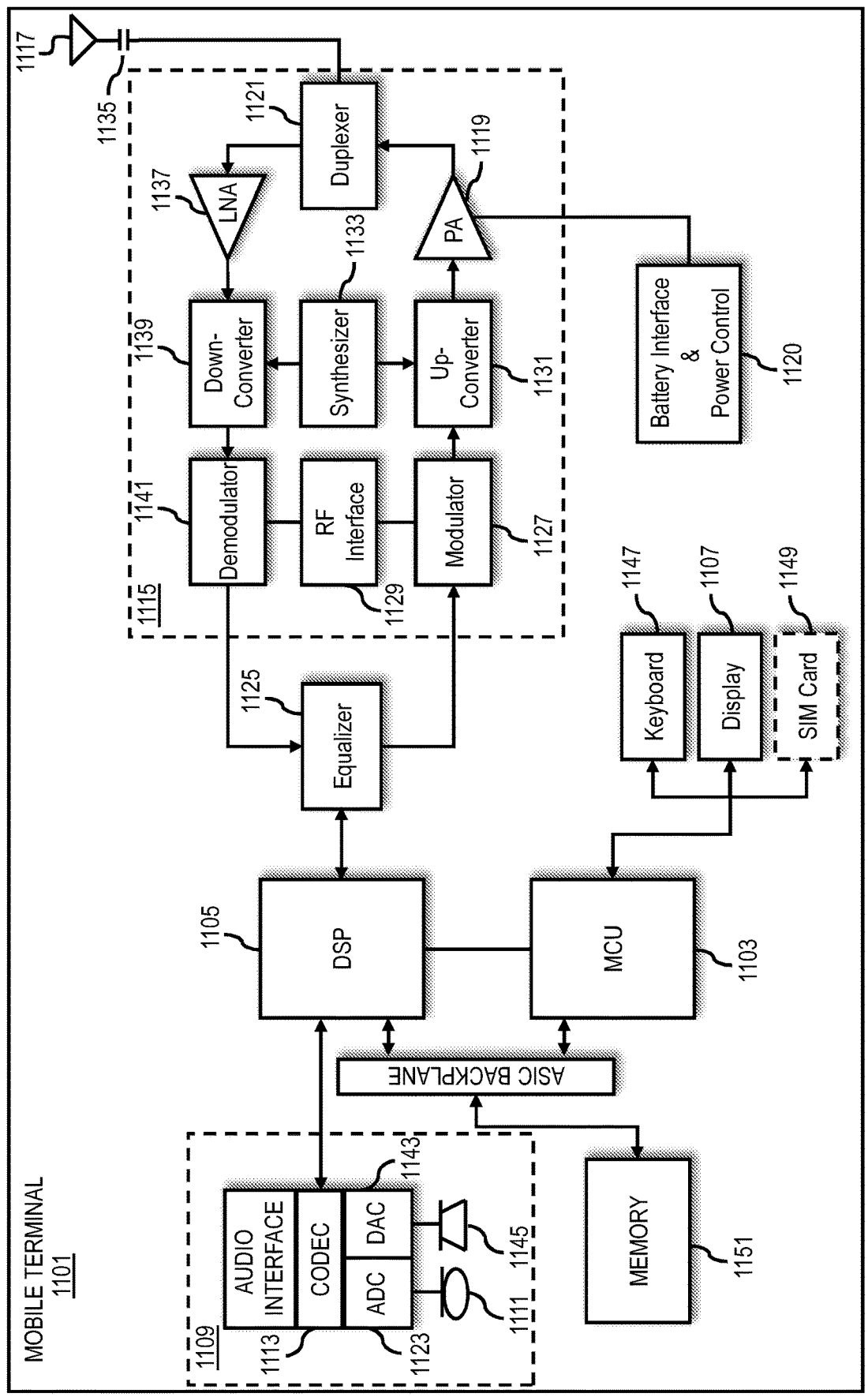
FIG. 11 is a diagram of a mobile terminal (e.g., handset or aerial vehicle or part thereof) that can be used to implement an embodiment.

FIG. 11 is a diagram of exemplary components of a mobile terminal 1101 (e.g., client device such as the UE 123 or aerial vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide user control of what historical mobility data to share with a third party application and/or service related to a quality of service to be delivered to the user. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving a request from a user to receive a service from a service provider, wherein a quality of service of the service is dependent on historical mobility data associated with the user;
determining a first part of the historical mobility data that is to be provided to the service provider to receive the service;
determining a second part of the historical mobility data that is predicted to increase the quality of service of the service; and
providing a user interface for the user to select between the first part, the second part, another part, or a combination thereof of the historical mobility data to provide to the service provider.

2. The method of claim 1, further comprising:
generating a recommended part of the historical mobility data to provide to the service provider to achieve on a target level for the quality of service,
wherein the user interface presents a representation of the recommended part of the historical mobility data.

3. The method of claim 2, wherein the recommended part of the historical mobility data is a minimum amount of the historical mobility data and is computed to achieve the target level for the quality of service.

4. The method of claim 1, further comprising:
computing impact data on the quality of service for a plurality of shared amounts of the historical mobility data,
wherein the user interface presents a representation of the impact data on the quality of service.

5. The method of claim 1, further comprising:
receiving an input for specifying an optimization parameter for determining the quality of service.

6. The method of claim 5, wherein the service is a delivery service, and wherein the optimization parameter is a delivery time.

7. The method of claim 6, wherein the historical mobility data is used to compute a prediction of the delivery time, a delivery location, or a combination thereof for the delivery service.

8. The method of claim 7, wherein a precision, an accuracy, or a combination thereof of the prediction of the delivery time, the delivery location, or a combination is based on an amount of the historical mobility data that is provided to the service provider.

9. The method of claim 8, wherein the prediction is computed with respect to a designated time frame.

10. The method of claim 1, wherein the user interface provides an option for the user to make a selection of the first part, the second part, or the another part of the historical mobility data applicable to only the user request or applicable to at least one subsequent request.

11. An apparatus for computing mobility insight data related to shared vehicles for a point of interest (POI) comprising:
at least one processor; and
at least one memory including computer program code for one or more programs,
the at least one memory and the computer program code configured to, with the at least one processor, cause the apparatus to perform at least the following,
receive a request from a user to receive a service from a service provider, wherein a quality of service of the service is dependent on historical mobility data associated with the user;

determine a first part of the historical mobility data that is to be provided to the service provider to receive the service;

determine a second part of the historical mobility data that is predicted to increase the quality of service of the service; and provide a user interface for the user to select between the first part, the second part, another part, or a combination thereof of the historical mobility data to provide to the service provider.

12. The apparatus of claim 11, wherein the apparatus is further caused to:

generate a recommended part of the historical mobility data to provide to the service provider to achieve on a target level for the quality of service, wherein the user interface presents a representation of the recommended part of the historical mobility data.

13. The apparatus of claim 12, wherein the recommended part of the historical mobility data is a minimum amount of the historical mobility data and is computed to achieve the target level for the quality of service.

14. The apparatus of claim 11, wherein the apparatus is further caused to:

compute impact data on the quality of service for a plurality of shared amounts of the historical mobility data, wherein the user interface presents a representation of the impact data on the quality of service.

15. The apparatus of claim 11, wherein the apparatus is further caused to:

receive an input for specifying an optimization parameter for determining the quality of service.

16. The apparatus of claim 15, wherein the service is a delivery service, and wherein the optimization parameter is a delivery time.

17. A non-transitory computer-readable storage medium for computing mobility insight data related to shared vehicles for a point of interest (POI) carrying one or more sequences of one or more instructions which, when executed by one or more processors, cause an apparatus to perform:

receiving a request from a user to receive a service from a service provider, wherein a quality of service of the service is dependent on historical mobility data associated with the user;

determining a first part of the historical mobility data that is to be provided to the service provider to receive the service;

determining a second part of the historical mobility data that is predicted to increase the quality of service of the service; and providing a user interface for the user to select between the first part, the second part, another part, or a combination thereof of the historical mobility data to provide to the service provider.

18. The non-transitory computer-readable storage medium of claim 17, wherein the apparatus is further caused to perform:

generating a recommended part of the historical mobility data to provide to the service provider to achieve on a target level for the quality of service, wherein the user interface presents a representation of the recommended part of the historical mobility data.

19. The non-transitory computer-readable storage medium of claim 18, wherein the recommended part of the historical mobility data is a minimum amount of the historical mobility data and is computed to achieve the target level for the quality of service.

20. The non-transitory computer-readable storage medium of claim 17, wherein the apparatus is further caused to perform:

computing impact data on the quality of service for a plurality of shared amounts of the historical mobility data, wherein the user interface presents a representation of the impact data on the quality of service.

* * * * *